United States Patent
Luebbe et al.

(10) Patent No.: US 12,384,943 B2
(45) Date of Patent: Aug. 12, 2025

(54) BOTH SIDES COATED AUTOMOTIVE PAINT COMPATIBLE LINER FOR STRUCTURAL ADHESIVE FILM

(71) Applicant: 3M INNOVATIVE PROPERTIES COMPANY, St. Paul, MN (US)

(72) Inventors: Stefan B. M. Luebbe, Essen (DE); Elisabeth Cura, Duesseldorf (DE); Kanta Kumar, Woodbury, MN (US); Michael A. Semonick, White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 736 days.

(21) Appl. No.: 17/251,434

(22) PCT Filed: Jun. 28, 2019

(86) PCT No.: PCT/IB2019/055507
§ 371 (c)(1),
(2) Date: Dec. 11, 2020

(87) PCT Pub. No.: WO2020/003235
PCT Pub. Date: Jan. 2, 2020

(65) Prior Publication Data
US 2021/0222034 A1    Jul. 22, 2021

(30) Foreign Application Priority Data
Jun. 29, 2018 (EP) ..................... 18181038

(51) Int. Cl.
| | | |
|---|---|---|
| C09J 7/40 | (2018.01) | |
| C08K 5/00 | (2006.01) | |
| C08K 5/101 | (2006.01) | |
| C08K 5/103 | (2006.01) | |
| C08L 75/14 | (2006.01) | |
| B32B 37/26 | (2006.01) | |

(52) U.S. Cl.
CPC ............. *C09J 7/403* (2018.01); *C08K 5/0025* (2013.01); *C08K 5/101* (2013.01); *C08K 5/103* (2013.01); *C08L 75/14* (2013.01); *C09J 7/401* (2018.01); *C09J 7/405* (2018.01); *B32B 2037/268* (2013.01); *B32B 2250/40* (2013.01); *C08L 2312/06* (2013.01); *C09J 2203/306* (2013.01); *C09J 2301/20* (2020.08); *C09J 2433/005* (2013.01); *C09J 2475/005* (2013.01); *Y10T 428/1476* (2015.01)

(58) Field of Classification Search
None
See application file for complete search history.

(56) References Cited

U.S. PATENT DOCUMENTS

| | | | |
|---|---|---|---|
| 7,816,477 B2 | 10/2010 | Suwa | |
| 2008/0176017 A1 | 7/2008 | Gouge et al. | |
| 2009/0000727 A1 | 1/2009 | Kumar et al. | |
| 2010/0093924 A1* | 4/2010 | Lerschmacher | C08F 290/00 |
| | | | 525/126 |
| 2013/0045349 A1 | 2/2013 | Kronzer et al. | |

FOREIGN PATENT DOCUMENTS

| | | |
|---|---|---|
| EP | 2813556 | 9/2015 |
| EP | 2700683 | 6/2016 |
| JP | H02-014276 | 1/1990 |
| JP | H02-014277 | 1/1990 |
| JP | 10157320 A * | 6/1998 |
| JP | 2001-031825 | 2/2001 |
| WO | WO 2017/087295 | 5/2017 |
| WO | WO 2017/087651 | 5/2017 |

OTHER PUBLICATIONS

Machine translation of JP 10-157320 A (Year: 1998).*
Extended EP Search Report for EP Application No. 18181038.3, mailed on Feb. 13, 2019, 2 pages.
International Search Report for PCT International Application No. PCT/IB2019/055507, mailed on Dec. 10, 2019, 4 pages.

* cited by examiner

*Primary Examiner* — Frank D Ducheneaux
(74) *Attorney, Agent, or Firm* — Carlos M. Téllez Rodríguez; 3M Innovative Properties Co

(57) ABSTRACT

An adhesive film liner comprising (a) a polymeric layer having a first and a second surface, the second surface being opposed to the first surface; (b) a first release layer located on top of the first surface of the polymeric layer, the first release layer comprising at least one polyurethane acrylate oligomer and/or at least one polyurethane methacrylate oligomer; and (c) a second release layer located on top of the second surface layer of the polymeric layer, the second release layer comprising at least one acrylate polymer.

15 Claims, No Drawings

BOTH SIDES COATED AUTOMOTIVE PAINT COMPATIBLE LINER FOR STRUCTURAL ADHESIVE FILM

CROSS REFERENCE TO RELATED APPLICATIONS

This application is a national stage filing under 35 U.S.C. 371 of PCT/IB2019/055507, filed Jun. 28, 2019, which claims the benefit of European Application No. 18181038.8, filed Jun. 29, 2018, the disclosures of which are incorporated by reference in their entireties herein.

FIELD

The present disclosure relates to both sides coated liners. The present disclosure further relates to adhesive articles, in particular structural adhesive films comprising the liners. In another aspect, the present disclosure relates to a level-wound roll comprising the adhesive film comprising the liners. In still a further aspect, the present disclosure relates to the use of the liners and the structural adhesive films comprising the liner for applications in automotive industries.

BACKGROUND

Adhesive films or adhesive tapes in all forms and shapes are usually provided with at least one liner covering the adhesive surface. This has a benefit in that the adhesive surface is protected against moisture, dirt and other influences which could be detrimental to the desired adhesive performance. Secondly, in a lot of cases, adhesive films or tapes are delivered either in staples of stripes or, more important for industrial applications, in wound rolls such as level-wound rolls. In all of these cases, it must be ensured that the adhesive surfaces do not stick to other strips, or to the next layer of the level-wound roll, since otherwise roll-off performance would drop or, even worse, damage may occur to the tape.

Moreover, a constant and often precisely defined release force of the liner from the adhesive surface is required for a number of industrial processes and applications of liner-provided tapes and films. In addition, in case of level-wound rolls, one side of the liner contacts the adhesive surface of the film or tape, while the opposite surface of the liner contacts the adjacent film or tape. This requires in most cases that the two opposite surfaces of the liner exhibit different release forces since the film or tape is usually needed to be unwound without the liner detaching from the adhesive surface. This is achieved in the state of the art by using silicone-based or fluorine-containing liners. For example, EP 2813556 relates to the use of a silicone-coated liner to decrease the adhesion between the liner and the adhesive. However, it was found that in some applications, the use of silicone- or fluorine-containing liners may give rise to problems. In particular, some of the silicone or fluorine containing organic compounds may bleed or diffuse into the adhesive layer, giving rise to undesired side effects. Furthermore, the presence of some silicone or fluorine compounds on surfaces may be problematic if they are to be further treated by painting. This is in particular true for manufacturing applications in which one side of the adhesive tape is adhered to a surface, while the liner is still in place on the other surface of the adhesive tape and will remain there for certain process steps, e.g. coating and/or painting before being removed. Apart from that, the presence of fluorine in polymeric liners may also be problematic from a recycling point of view since in industrial processes large amounts of liners accumulate. As such, release liners comprising a hardcoat layer on its surface are also known in the art. For example, US 2009/0000727 describes a release layer obtained from curing methacrylates.

SUMMARY

Without contesting the technical advantages associated with liners for adhesive tapes and release layers for such tapes known in the art for applications, there is still a strong need for liners of adhesive films or tapes having different release forces, are suitable for industrial manufacturing applications, and do desirably not comprise silicone- or fluorine-containing release layers.

Other advantages of the liner for adhesive tapes and the adhesive tapes comprising these liners of the present disclosure will be apparent from the following description.

The present disclosure provides a liner for an adhesive film, with the liner comprising (a) a polymeric layer having a first and a second surface, the second surface being opposed to the first surface; (b) a first release layer located on top of the first surface of the polymeric layer, the first release layer comprising at least one polyurethane acrylate oligomer and/or at least one polyurethane methacrylate oligomer; and (c) a second release layer located on top of the second surface layer of the polymeric layer, the second release layer comprising at least one acrylate polymer.

The present disclosure also provides an adhesive article, comprising an adhesive layer having a first and a second surface, the second surface being opposed to the first surface; and at least one liner according to any one of the preceding claims atop of the first and/or second surface of the adhesive layer, wherein the first release layer of the liner and the first surface of the adhesive layer have a common interface.

Furthermore, the present disclosure relates to certain uses in applications of the liner and adhesive articles as described herein in automotive, commercial transportation, aerospace and abrasives industries.

DETAILED DESCRIPTION OF EXEMPLARY EMBODIMENTS

Before any embodiments of this disclosure are explained in detail, it is to be understood that the disclosure is not limited in its application to the details of construction and the arrangement of components set forth in the following description. The invention is capable of other embodiments and of being practiced or of being carried out in various ways. As used herein, the term "a", "an", and "the" are used interchangeably and mean one or more; and "and/or" is used to indicate one or both stated cases may occur, for example A and/or B includes, (A and B) and (A or B). Also herein, recitation of ranges by endpoints includes all numbers subsumed within that range (e.g., 1 to 10 includes 1.4, 1.9, 2.33, 5.75, 9.98, etc.). Also herein, recitation of "at least one" includes all numbers of one and greater (e.g., at least 2, at least 4, at least 6, at least 8, at least 10, at least 25, at least 50, at least 100, etc.). Also, it is to be understood that the phraseology and terminology used herein is for the purpose of description and should not be regarded as limiting. Contrary to the use of "consisting", which is meant to be limiting, the use of "including," "containing", "comprising," or "having" and variations thereof is meant to be not limiting and to encompass the items listed thereafter as well as additional items.

Amounts of ingredients of a composition may be indicated by % by weight (or "% wt". or "wt.-%") unless specified otherwise. The amounts of all ingredients gives 100% wt unless specified otherwise. If the amounts of ingredients is identified by % mole the amount of all ingredients gives 100% mole unless specified otherwise.

The terms "solid" and "liquid" refer to ambient conditions (23° C., 1 bar).

Average particle sizes as referred to herein be number averages. In case of particles that are only substantially spherical the particle size is determined by adding the length of the two main (largest orthogonal) axes of the particle and dividing it by two. "Substantially spherical" means one or all main axes (x-, y- or z-axis) may deviate from the required length to form a perfect sphere by up to 50%, preferably up to 25%.

Unless explicitly stated otherwise, all embodiments and optional features of the present disclosure can be combined freely.

Parameters may be preferably determined as explicitly disclosed in the experimental section.

The first aspect of the present disclosure is a liner for an adhesive film, comprising
  (a) a polymeric layer having a first and a second surface, the second surface being opposed to the first surface,
  (b) a first release layer located on top of the first surface of the polymeric layer, the first release layer comprising at least one polyurethane acrylate oligomer and/or at least one polyurethane methacrylate oligomer;
  (c) a second release layer located on top of the second surface layer of the polymeric layer, the second release layer comprising at least one acrylate polymer.

It has been found that the combination of first and second release layers as described herein provide different release forces, while also providing for sufficient protection of an adhesive layer. Moreover, it was found that the release layers show high robustness of coating anchorage, leading to high adherence of the release layers to the polymeric layer. This means that these layers would survive harsher conditions in industrial applications (such as in body-in-white processes in particular in automotive industry,) leading also to no or low risk of contamination of parts to be processed with release layer materials. It was also found that both release first and second release layers of the liners as described herein are compatible with paints used in particular in automotive industries, which is particularly advantageous for applications in these industries such as body-in-white processes. Furthermore, the controlled release properties of the liner when used in combination with an adhesive, in particular in roll-form (such as in level-wound rolls) enable the use in high-speed automated robotic applications, which also represents a significant advantage in industries with high throughput, such as the automotive industry.

Generally, the liner according to the present disclosure is polymeric liner having two opposite first and second surfaces, which each are cover by the first and second release layers, respectively. The polymeric layer, i.e. the core of the liner as described herein, may be a polymeric liner known in the art, provided that it is compatible with the first and second release layers as described herein. Preferably, the polymeric layer of the liner as described herein comprises at least one polymer selected from polyethylene, polyurethane, polyacrylate, polyvinylchloride, polypropylene, polystyrene, polyacrylonitrile, polyethylene terephthalate, preferably polyethylene. An exemplary polymeric liner which may be used for the purposes of the present disclosure is available from 3M Company (St. Paul, MS, USA) under the trade designation Release Liner 5977.

On the first surface of the liner according to the present disclosure, there is provided a first release layer. The first release layer comprises at least one polyurethane acrylate oligomer and/or at least one polyurethane methacrylate oligomer. This has the effect that the first release layer exhibits a higher release force from an adhesive layer than the second release layer. For industrial applications this is particularly important. In the case of an adhesive film having two opposite surfaces, each surface may be provided with either the first or second release layer of the present disclosure, respectively. This means that the second release layer may be taken off from the adhesive surface in a controlled manner such that the first release layer still adheres to the other adhesive surface. If the adhesive article is in the form of an adhesive film or tape wound in a level-wound roll, then this level-wound roll may easily be unwound such that the second release layer of the liner disconnects from the adhesive surface of the adhesive film or taper, thereby exposing one adhesive surface, while the other adhesive surface of the adhesive film or tape will be still covered by the liner and the first release layer. Without being wanted to be bound by theory, it is assumed that (compared to the second release layer), the incorporation or polar groups such as the urethane moiety may increase the interaction between the first release layer and an adhesive layer. This is particularly true for structural adhesive layers.

Preferably, the first release layer is obtained from a composition comprising
  (b1) at least one aliphatic urethane acrylate or aliphatic urethane methacrylate;
  (b2) at least one monoacrylate or at least one monomethacrylate; and
  (b3) at least one diacrylate and/or at least one triacrylate, or at least one dimethacrylate and/or at least one trimethacrylate.

In this regard, it is preferred that the at least one aliphatic urethane is a hydrophobic urethane, preferably a urethane acrylate or urethane methacrylate. Aliphatic urethane acrylates and methacrylates are available, for example, from Sartomer (Arkema Group) under the trade designation CN 9007 and CN 9014, respectively.

Preferably, the at least one monoacrylate or the at least one monomethacrylate are linear or branched aliphatic esters. It is preferred that these esters contain at least 8, preferably at least 10, more preferably at least 12 carbon atoms. In a preferred example, the monoacrylate or monomethacrylate is selected from isostearyl acrylate, neostearyl acrylate (i.e. 2-octyldecyl acrylate and 2-hexyldodecyl acrylate, respectively.) For example, a 1:1 mixture of 2-octyldecyl acrylate and 2-hexyldodecyl acrylate (also referred to as 2-heptylundecyl acrylate) is commercially available from OSAKA Organic Chemical Industry Ltd. (Japan).

With regard to the amounts of the single constituents, taken alone and preferably in combination, the composition of the first release layer comprises
  (b1) at least one aliphatic urethane acrylate or aliphatic urethane methacrylate in an amount in the range of from 1 to 70 wt.-%, preferably from 2.5 to 60 wt.-%, more preferably in the range of from 4 to 50 wt.-%, based on the total weight of the composition;
  (b2) at least one monoacrylate or at least one monomethacrylate in an amount in the range of from 30 to 95 wt.-%, preferably from 35 to 92 wt.-%, more preferably from 40 to 90 wt.-%, based on the total weight of the composition;

(b3) at least one diacrylate and/or at least one triacrylate, or at least one dimethacrylate and/or at least one trimethacrylate in an amount in the range of from 1 to 25 wt.-%, preferably from 5 to 20 wt.-%, more preferably in the range of from 7.5 to 15 wt.-%, based on the total weight of the composition.

It is further preferred that the composition of the first release layer further comprises at least one photoinitiator. The use of a photoinitiator has the advantage that the composition may be cured in a controlled manner via UV light or similar measures well-known to the skilled person. Furthermore, curing the acrylate and/or methacrylate in this manner may give rise to an anchoring of the first release layer to the polymeric liner core of the liner as described herein. This may have the advantageous effect of decreasing the risk of release composition bleed-out and contamination of surfaces on which the adhesive together with the liner are employed. In particular, this is the case in so-called body-in-white processes widely used in automotive industries.

Furthermore, it is preferred that the composition from which the first release layer is obtained from is dissolved, partially dissolved or dispersed in at least one solvent. Solvents which are suitable for this purpose are well-known to the skilled person and readily commercially available. For example, the solvent may be selected from ethers (e.g. diethylether), ester (e.g. acetylacetate), ketones (e.g. acetone, MEK), chlorinated solvents (e.g. dichloromethane) and other organic solvents such as toluene, pentane, hexanes etc. Mixtures may also be employed, as known to the skilled person. For example, a 1:1 blend of toluene and MEK (methylethylketone) may be used. The solids content of the first release composition solutions is preferably lower than 15%, preferably lower than 10% more preferably lower than 5%. In preferred embodiments, it may be as low as 4%, 2% or even as low as 1%. Using such diluted solutions has the advantage that thin and homogeneous releaser layers may be obtained therefrom. Coating the first release composition solutions onto the polymeric liner and subsequent curing of the film may be achieved via well-established procedures known in the art.

The second release layer of the liner according to the present invention layer comprises at least one acrylate polymer or copolymer. In this regard, it is preferred that the at least one acrylate polymer or copolymer of the second release layer is obtained from a composition comprising a poly(meth)acrylate ester having an ultraviolet active group.

The poly(meth)acrylate as described herein is preferably a copolymer formed from an acrylic monomer component containing a (meth)acrylate having $C_{12-30}$ alkyl group (hereinafter also referred to as a "first alkyl (meth)acrylate") and a (meth)acrylate having $C_{1-12}$ alkyl group (hereinafter also referred to as a "second alkyl (meth)acrylate"), and a (meth) acrylate ester having an ultraviolet active group. In this case, the alkyl group of the first alkyl (meth)acrylate constitutes a comparatively long side chain in the copolymer. Such a long alkyl side chain is effective to reduce a surface energy of the acrylic release agent. This surface energy is estimated by the "contact angle". As used herein, the term "contact angle" is defined as a value of a contact angle as measured by a mixed solution (volume ratio of 90/10) having a wetting tension of 25.4 N/m described in JIS K6768: 1999. This measurement is conducted under the conditions of a temperature of 23±1° C. and a relative humidity of 50±5%.

The preferred long alkyl side chain does not have a polar functional group such as carboxyl group, hydroxyl group, or nitrogen- or phosphorus-containing group. Although the long alkyl side chain can usually maintain a comparatively low peel force at low temperature and high temperature, it is difficult to maintain at a comparatively low peel force when a release agent having the polar functional group is exposed to high temperature. Preferred first alkyl (meth) acrylate containing a long alkyl side chain includes lauryl (meth)acrylate, cetyl (meth)acrylate, stearyl (meth)acrylate, or behenyl (meth)acrylate.

The alkyl group of the second alkyl (meth)acrylate constitutes a comparatively short side chain in the copolymer described above. Such a short alkyl side chain can reduce the glass transition temperature of the release agent precursor to 30° C. or lower. As a result, it can also reduce the storage elastic modulus to a value within a range from $1\times10^2$ to $3\times10^6$ Pa, thus making it possible to provide smooth peeling from a pressure-sensitive adhesive to the acrylic release agent. As used herein, the storage elastic modulus (G') of the acrylic release agent precursor is a value as measured at 20° C. and a frequency of 1 Hz in a shear mode, using a viscoelasticity meter (for example, Dynamic Analyzer RDA II manufactured by Rheometrics). The preferred short alkyl side chain does not have the polar functional group described above, similar to the alkyl side chain of the first alkyl (meth)acrylate.

The copolymer does not limit the amount of two kinds of acrylic monomer components described above is not usually limited, but contains the first alkyl (meth)acrylate or second alkyl (meth)acrylate in the amount within a range from 10 to 90 wt.-% based on the total weight of the first alkyl (meth)acrylate and second alkyl (meth)acrylate. When the amount of the first alkyl (meth)acrylate exceeds about 90 wt.-%, the acrylic release agent has comparatively high crystallinity as a result of a strong influence of the first alkyl (meth)acrylate and tends to provide jerky peel. On the other hand, when the amount of the second alkyl (meth)acrylate exceeds about 90 wt.-%, the acrylic release agent, tends to provide a comparatively high peel force, as a result of a strong influence of the second alkyl (meth)acrylate. Preferably, both of the first alkyl (meth)acrylate and the second alkyl (meth)acrylate have a $C_{12}$ alkyl group.

It is further preferred that the poly(meth)acrylate ester as described herein is derived from a monomer component containing an alkyl (meth)acrylate having a branched $C_{8-30}$ alkyl group, and a (meth)acrylate ester having an ultraviolet active group. Preferred examples of the alkyl (meth)acrylate having a branched $C_{8-30}$ alkyl group include 2-ethylhexyl (meth)acrylate, 2-hexyldodecyl acrylate, 2-heptylundeceyl acrylate, 2-octyldecyl acrylate, and isononyl (meth)acrylate. Such a (meth)acrylate having a branched side chain can reduce the storage elastic modulus and surface energy by lowering the crystallinity itself. Thus, it is not necessary for the acrylic release agent precursor to contain two components such as first alkyl (meth)acrylate and second alkyl (meth)acrylate described above as far as it has a branched $C_{8-30}$ alkyl group. The polymer of 2-hexyldecyl acrylate or 2-octyldecyl acrylate constitutes a preferred acrylic release agent precursor because it can simply reduce the surface energy of the release agent.

According to the present disclosure, as described above, the poly(meth)acrylate ester used as precursor for the second release layer has an ultraviolet active group. This ultraviolet active group can generate a free radical in the release agent precursor by irradiation with ultraviolet radiation. The generated free radical promotes crosslinking of the release agent precursor and adhesion to the substrate, resulting in an improvement in adhesion between the substrate and the release agent. As far as the object and effect of the present disclosure is achieved, the ultraviolet active group is not specifically limited, but is preferably those derived from benzophenone or acetophenone. Introduction of the ultraviolet active group into the poly(meth)acrylate ester can be conducted by incorporating a (meth)acrylate ester having an ultraviolet active group as a monomer component and polymerizing the monomer component containing the (meth)acrylate ester. A preferred amount of the (meth) acrylate ester having an ultraviolet active group is within a range from 0.01 to 1.0 wt.-% per poly(meth)acrylate ester unit. When the amount of the (meth)acrylate ester having an ultraviolet active group is lower than 0.01 wt.-%, there is a tendency that a substantial effect of reducing the ultraviolet irradiation dose required to form the release agent cannot be obtained. Even if the amount of the (meth)acrylate ester having an ultraviolet active group is greater than 1.0 wt.-%, the effect is already sufficient under conventional conditions of irradiation with ultraviolet radiation and an influence of the addition of a new component is likely to be exerted on the peel force.

The polymer of the acrylic release agent precursor for the second release layer of the liner according to the present disclosure preferably has a weight-average molecular weight within a range from 100,000 to 2,000,000. When the polymer has a weight-average molecular weight of lower than about 100,000, the resulting acrylic release agent precursor has an undesirable high peel force. When the polymer has a weight-average molecular weight of greater than about 2,000,000, satisfactory peel performances are obtained, however, it tends to become difficult to treat the polymer during polymerization reaction described hereinafter because of its high viscosity.

The monomer component described above can be usually polymerized in the presence of a predetermined amount of a polymerization initiator, thereby to form an acrylic release agent precursor. Preferred polymerization is solution polymerization. This solution polymerization can be usually conducted in the state where the monomer component is dissolved in a solvent, together with the polymerization initiator, in an atmosphere of an inert gas such as nitrogen at 50 to 100° C. As a result, the solution of the polymer as a reaction product can be used as it is after the completion of the polymerization. As the solvent, for example ethyl acetate, methyl ethyl ketone or heptane can be used. If necessary, the molecular weight of the polymer may be controlled to the above-described range by adding a chain transfer agent to the solvent.

The polymerization initiator is not specifically limited. For example, an azobis compound such as 2,2'-azobisisobutyronitrile, 2,2'-azobis(2-methylbutyronitrile) or 2,2'-azobis (2,4-dimethylvaleronitrile) and a peroxide such as benzoyl peroxide or lauroyl peroxide may be used as the polymerization initiator. Particularly, 2,2'-azobisisobutyronitrile and 2,2'-azobis(2-methylbutyronitrile) are commercially available from Fujifilm-Wako Pure Chemicals Industries, Ltd. under the trade name of V-60 and V-59. Preferably, the polymerization initiator is used in the amount within a range from 0.005 to 0.5 wt.-% based on the total weight of the monomer component. When the amount of the polymerization initiator is lower than about 0.005 wt.-%, the polymerization reaction tends to proceed comparatively slowly. On the other hand, when the amount of the polymerization initiator is greater than about 0.5 wt.-%, the resulting acrylic release agent precursor tends to have a comparatively low molecular weight.

The acrylic release agent precursor as described above is converted into an acrylic release agent (i.e. the second release layer of the liner according to the present disclosure) by irradiating with ultraviolet radiation, after the precursor is coated on a substrate. This acrylic release agent has a contact angle of 15° or more to a mixed solution of methanol and water (volume ratio of 90/10) having a wetting tension of 25.4 N/m. Such a contact angle is advantageous, since it effectively inhibits a pressure-sensitive adhesive from wetting and spreading over the surface of the acrylic release agent and also reduces the affinity with the adhesive.

Also, this acrylic release agent can provide a certain, comparatively low peel force of 0.05 to 3 N/25 mm to a pressure-sensitive adhesive such as an acrylic pressure-sensitive adhesive. Such a peel force is advantageous to easily peel a release sheet from an adhesive tape or an adhesive sheet. Preferably, the acrylic release agent has a peel force of lower than 0.2 N/25 mm, as measured by the process described in the examples, to a general structural adhesive such as the epoxy-resin based structural adhesive in the examples described hereinafter.

It is highly preferred that the first and/or the second release layer essentially do not comprise silicone such as silicone-containing release compounds used in liner technology according to the state of the art. That is, it is highly preferred that the first and/or second release layer are essentially silicone-free. It is particularly preferred that the first and second release layers are essentially silicone-free. This means that the first and second release layers do not contain silicone-compounds as release agents. Similarly, it is highly preferred that the first and/or second release layer do not comprise fluorine compounds such as fluorine-containing release compounds. It is particularly preferred that the first and second release layers are essentially fluorine-free. This means that the first and second release layers do not contain fluorine-compounds as release agents. For a lot of applications in automotive, aerospace, abrasives and other industries this represents a considerably advantage since the presence of silicone and/or fluorine may negatively impact the performance of adhesive or other materials such as paints which are coated onto the liners. This compatibility with paints, in particular with paints commonly used in automotive industries, enable the use of the liners according to the present invention, in particular in combination with an adhesive strip or tape, in common applications in automotive industries, in particular in body-in-white applications.

The present disclosure further provides an adhesive article, comprising an adhesive layer having a first and a second surface, the second surface being opposed to the first surface; and at least one first liner as described herein of the first and/or second surface of the adhesive layer, wherein the first release layer of the at least one first liner and the first surface of the adhesive layer have a common interface.

This adhesive article may now exhibit the combined advantages of the liner according to the present disclosure. Preferably, the adhesive article is an adhesive sheet, an adhesive film or an adhesive tape, of which adhesive film and adhesive tape are particularly preferred. Furthermore, since the release force of the first release layer to the adhesive is larger than the release force of the second release layer, the adhesive article may be stapled (in case of adhesive strips, adhesive sheets or adhesive films) or wound into level-wound rolls (in case of adhesive films or, in particular, adhesive tapes) since these may then be easily unstapled or unwound in a controlled manner without the first release layer coming off from the adhesive layer. Accordingly, it is preferred that the adhesive article is in form of a roll, preferably a level-wound roll. Level-wound rolls as such are known in the art. A preferred example of a level-wound roll. The adhesive article may also comprise a second liner as described herein, i.e. the first release layer of the second liner and the second major adhesive surface of the adhesive layer having a common interface. Another level-wound roll comprising two liners is described, for example, in EP 2813556 A1, the disclosures of which are incorporated herein by reference.

The adhesive of the adhesive layer of the adhesive article according to the present disclosures is preferably selected from pressure sensitive adhesives and structural adhesives. Preferably, the adhesive layer is selected from structural adhesives. Preferably, the structural adhesive comprises at least one epoxy resin and at least one epoxy curing agent. In this regard, it is also preferred that the adhesive, preferably the structural adhesive, is an adhesive strip or tape.

The at least one epoxy resin may be selected from epichlorhydrine products of bisphenol A and/or bisphenol F. Any organic compound having at least one oxirane ring polymerizable by a ring opening reaction may be used as an epoxy compound in the thermosettable composition of the structural adhesive film according to the disclosure, provided they have an average epoxy equivalent weight of less than 250 g/equivalent. Such materials, broadly called epoxies, include monomeric epoxy compounds and polymeric epoxy compounds and can be aliphatic, cycloaliphatic, aromatic or heterocyclic. Useful materials generally have at least two polymerizable epoxy groups per molecule and, more preferably, from two to four polymerizable epoxy groups per molecule.

These epoxy compounds are generally liquid, or semi-liquid, at room temperature and are frequently also referred to as reactive epoxy thinners or reactive epoxy diluents. These compounds are preferably selected from the group of optionally substituted di- and polyglycidyl ethers of di- and polyphenols or aliphatic or cycloaliphatic hydroxyl compounds. Suitable epoxy compounds for use herein are commercially available from Hexion specialty chemicals, Inc under tradename Epikote™ Resin 828, under tradename Epon® Resin 824/825/826/828/830/834/863/164 from Dow Chemical Co. under tradename DER 331, DER 332 and DER 334; from Resolution Performance Products; from Huntsman under tradename Araldite® GY 250/260; or from Leuna Harze under tradename EPILOX® A 1900, P 22-00.

Epoxy compounds which are useful in the structural adhesive compositions according to the present disclosure are preferably derived from bisphenol A, bisphenol E, bisphenol F, bisphenol S, aliphatic and aromatic amines, such as methylene dianiline and aminophenols, and halogen substituted bisphenol resins, novolacs, aliphatic epoxies, and combinations thereof and/or therebetween. More preferably, the organic epoxies are selected from the group comprising diglycidyl ethers of bisphenol A and bisphenol F and epoxy novolacs.

The amount of epoxy compound in the thermosettable structural adhesive composition is preferably comprised from 20 to 50 wt.-%, preferably from 30 to 50 wt.-%, more preferably from 38 to 50 wt.-%, based on the total weight of the structural adhesive composition.

The at least one epoxy resin may have an epoxy equivalent of at least 100 grams/equivalent. In addition, the adhesive as described herein may further comprise at least one thermoplastic resin, at least one toughening agent (preferably selected from butadiene rubbers and core-shell rubbers), at least one curative accelerator, and/or at least one physical blowing agent.

Suitable thermoplastic compounds for use herein will be easily identified by those skilled in the art, in the light of the present description. Preferably, the thermoplastic compound is a thermoplastic resin. Thus, the terms "thermoplastic compound" and "thermoplastic resin" may be used interchangeably in the present disclosure. Thermoplastic compounds and thermoplastic resins may also frequently be referred to as film forming agents.

In a preferred aspect, thermoplastic resins for use herein have a Tg (glass transition temperature measured by differential scanning calorimetry (DSC)) comprised between 70° C. and 120° C., preferably between 80° C. and 100° C., more preferably between 85° C. and 95° C. Suitable thermoplastic resins for use herein are preferably selected from the group consisting of polyether thermoplastic resins, polypropylene thermoplastic resins, polyvinyl chloride thermoplastic resins, polyester thermoplastic resins, polycaprolactone thermoplastic resins, polystyrene thermoplastic resins, polycarbonate thermoplastic resins, polyamide thermoplastic resins, and any combinations of mixtures thereof.

Suitable thermoplastic resins for use herein may be advantageously selected from the group of polyether thermoplastic resins, and preferably polyhydroxyether thermoplastic resins. In a preferred aspect, thermoplastic resins for use herein are selected from the group of polyhydroxyether thermoplastic resins, which are preferably selected from the group consisting of phenoxy resins, polyether diamine resins, polyvinylacetal resins, in particular polyvinyl butyral resins, and any combinations or mixtures thereof. Examples of suitable polyvinylacetal resins for use herein include Vinyl Chloride/Vinyl Acetate Copolymers, Carboxyl-Modified Vinyl Copolymers, and Hydroxyl-Modified Vinyl Copolymers, commercially available from Dow Chemicals. In a very preferred aspect of the disclosure, the thermoplastic resin for use herein is selected from the group of phenoxy resins. Suitable thermoplastic resins for use herein are commercially available from Gabriel Performance Productsunder trade designation PKHP, PKHH, PKHA, PKHB, PKHC, PKFE, PKHJ, PKHM-30 or PKHM-301.

Any epoxy curing agent, commonly known in the art, may be used in the thermosettable composition of the structural adhesive composition as described herein. Suitable epoxy curing agents for use herein are materials that react with the oxirane ring of the organic epoxide to cause substantial cross-linking of the epoxide. These materials contain at least one nucleophilic or electrophilic moiety (such as an active hydrogen atom) that causes the cross-linking reaction to occur. Epoxy curing agents are distinct from epoxide chain extension agents, which primarily become lodged between chains of the organic epoxide and cause little, if any cross-linking. Epoxy curing agents as used herein are also known in the art as epoxy hardeners, epoxide hardeners, catalysts, epoxy curatives, and curatives.

Sometimes, differentiation is made between epoxy curing agents and accelerators which are used to increase the rate of the epoxide curing reaction. Accelerators typically are multifunctional materials which can also be classified as epoxy curing agents. Therefore, in the present specification, no differentiation is made between curing agents and accelerators.

Epoxy curing agents for use herein include those which are conventionally used for curing epoxy resin compositions and forming crosslinked polymer networks. Suitable epoxy curing agents may also be referred to as latent curing agents, which are typically chosen so that they do not react with the epoxy resin until the appropriate processing conditions are applied. Such compounds also include aliphatic and aromatic tertiary amines such as dimethylaminopropylamine and pyridine, which may act as catalysts to generate substantial crosslinking. Further, boron complexes, in particular boron complexes with monoethanolamine, imidazoles such as 2-ethyl-methylimidazole, guanidines such as tetramethyl guanidine, dicyanodiamide (often referred to as DICY), substituted ureas such as toluene diisocyanate urea, and acid anhydrides such as the 4-methyltetrahydroxyphthalic acid anhydride, 3-methyltetrahydroxyphthalic acid anhydride and methylnorbornenephthalic acid anhydride, may be employed. Still other useful epoxy curing agents include polyamines, mercaptans and phenols. Other epoxy curing agents for use herein include encapsulated amines, Lewis acids salts, transition metal complexes and molecular sieves. Preferably, the epoxy curing agent is selected from the group consisting of amines, acid anhydrides, guanidines, dicyandiamide and mixtures thereof. More preferably, the epoxy curing agent contains dicyandiamide. Suitable epoxy curing agents for use herein are commercially available from Air Products under tradename Amicure® CG-1200.

Preferred epoxy structural adhesive compositions and structural adhesives films which are particular useful in combination with the liner according to the present disclosure are disclosed in EP 2700683 A1, WO 2017/087295 A1 and WO 2017/087651 A2, the disclosure of which are explicitly incorporated herein by reference.

Due to the respective outstanding properties, the present disclosure provides a use of the liner as described herein or of the adhesive article as described herein in industrial manufacturing operations in electronic, automotive, aerospace and abrasives industries. In particular, the different release properties of the first and second release layers in particular with respect to commonly used adhesives, in particular structural adhesives, provide for excellent suitability for robotic applications of the liners and adhesive articles as described herein. This applies in particular for robotic applications of rolls, in particular level-wound rolls in manufacturing operations in automotive industries. In addition, the paint compatibility of both first and second release layers of the liners according to the present disclosure provide for suitability in multiple different applications in automotive industries, in particular in so-called body-in-white applications. Accordingly, the present disclosure provides a use of the liners as described herein and the adhesive articles as described herein automated or robotic applications in body-in-white processes in the automotive industry.

EXAMPLES

The present disclosure is further described without however wanting to limit the disclosure thereto. The following examples are provided to illustrate certain embodiments but are not meant to be limited in any way. Prior to that some test methods used to characterize materials and their properties will be described. All parts and percentages are by weight unless otherwise indicated.

Test Methods
180°-Peel-Adhesion Test at 305 mm/Min (According to Test Method PSTC 101, Test Method D):

This peel adhesion test measures the effectiveness of release liners (prepared using release liners of the release composition solutions later described) that are conditioned for 72 hours at a constant temperature and relative humidity (23° C.+/−2° C., 50% relative humidity +1-5%) prior to testing. The aged release value is hereby a quantitative measure of the force required to remove a release liner from the flexible adhesive at a specific angle and rate of removal.

The 180° angle peel adhesion strength was measured for all test samples in accordance with the test method described in Pressure Sensitive Tape Council PSTC-101 Method D (Rev May 2007) 'Peel Adhesion of Pressure Sensitive Tape.

For testing stainless steel test panels having a dimension of 126 mm×50 mm×2 mm (commercially available from Rocholl GmbH) were used as test substrate and cleaned prior to use. The testing samples obtained for the peel adhesion measurements were cut in machine direction to a width of 25 mm and a length of approximately 300 mm using a cutter consisting of two razor blades set apart by 25 mm. All testing samples had as common construction a centered epoxy adhesive film covered by two opposing, protective liners.

After the testing samples were cut to the required dimension, the respective protective liner, which was not subject to peel adhesion testing, was removed from one side of the epoxy adhesive film. Then approximately 125 mm of the now linerless epoxy adhesive side was placed upon the cleaned stainless steel panel and rubbed down on the test panel using light thumb pressure.

The remaining liner on the upper side of epoxy adhesive film was then separated from the epoxy adhesive film at the free end and the free part of the epoxy adhesive film, which was not bonded to the test panel, was cut away. The liner on top of the epoxy adhesive film part adhered to the test panel was hereby left undisturbed.

For peel adhesion testing the test panel with the applied testing sample was in a first step clamped into the lower movable jaw of a constant-rate-of extension (CRE) tensile tester (Model Z020 commercially available from Zwick/Roell GmbH, Ulm, Germany) and the free end of the liner grasped in the upper jaw of the tensile tester in a configuration commonly utilized for 1800 peel adhesion measurements. The tensile tester was set at 305 mm/min. jaw separation rate. After the movable jaw had started in motion the first values obtained during the first 24 mm of the mechanical peeling were disregarded. Test results are expressed in Newton per cm (N/cm). The quoted peel values are the average of five 180°-peel measurements.

List of Materials

Table 1 discloses the list of raw materials used for the making of the release liner composition precursors.

TABLE 1

List of materials for release liner composition precursors.

| Material | Supplier | Function | Description |
| --- | --- | --- | --- |
| CN 9007 | Sartomer-Arkema Group | Imparts flexibility | Difunctional aliphatic urethane acrylate oligomer |
| CN 9014 | Sartomer-Arkema Group | Imparts flexibility | Difunctional hydrophobic aliphatic polyurethane acrylate oligomer |
| NK ester ISA | OSAKA Organic Chemical Industry LTD. | Imparts release | Mixture of 2-octyldecyl acrylate and 2-hexyldodecyl acrylate in a weight ratio of 1:1, also referred to as 2-heptylundecyl acrylate |
| Darocure 1173 | BASF | Photo initiator | 2-Hydroxy-2-methyl-1-phenyl-propan-1-one |
| SR351H | Sartomer-Arkema Group | cross-linker | Trimethyolpropane Triacrylate |

Table 2 discloses the list of raw materials used for making the thermosettable epoxy adhesive film.

TABLE 2

List of materials for thermosettably epoxy film.

| Material | Supplier | Function | Description |
|---|---|---|---|
| Epikote 828 | Hexion specialty chemicals, Inc | Epoxy resin | Trade designation of a liquid reaction product of epichlorohydrin and bisphenol A having an approximate epoxy equivalent weight of 184-190 grams/equivalent. |
| PK-HP 200 | Gabriel Performance Products | Thermoplastic resin | Trade designation of a phenoxy resin. |
| Paraloid EXL 2650J | Dow Chemical | Thoughening agent | Trade designation of a core-shell toughening agent based on butadiene rubber. |
| Amicure CG1200 | Air Products | Primary Curative | Trade designation of 2-cyanoguanidine (dicyandiamide) |
| Omicure U52M | CVC Specialty Chemicals, USA | Curative accelerator | Trade designation of 4,4 methylene bisphenyl dimethyl urea |
| Microsphere ® F48D | Matsumoto Yushi Seiyaku Co., Ltd | Physical blowing agent | Trade designation of a thermoexpandable microcapsuleproduced by encapsulating volatile hydrocarbon with acrylic copolymer. |

Release Composition Precursor Solutions Preparation

All release composition precursor solutions are shown in table 3 and numbered as RCP 01S to RCP-04S1

TABLE 3

Release composition precursor solutions.

| Release comp # | CN9014 (in g) | KN ester ISA (in g) | SR351H (In g) | Darocure 1173 (in g) | Sum (in g) |
|---|---|---|---|---|---|
| RCP-01S | 40 | 50 | 10 | 2 | 102 |
| RCP-02S | 20 | 70 | 10 | 2 | 102 |
| RCP-03S | 5 | 85 | 10 | 2 | 102 |
| RCP-04S | 30 | 60 | 10 | 2 | 102 |
| RCP-04S1 | 30 | 60 | 10 | 1 | 101 |

For preparation of the final release composition solutions, first CN9014 was charged with a solvent mixture containing a 50/50 blend of toluene and MEK followed by the addition of NK ester ISA, SR351H and photoinitiator Darocure 1173. All components were blended well to obtain for RCP-01S to RCP04S a 2 wt.-% solids solution of the release composition precursors.

Additionally, the release composition precursor of RCP-04S was also diluted to 1 wt % solids and is referred in upper table 3 as RCP-04S1. RCP-04S1 and RCP-04S are hereby used to demonstrate the influence on peel adhesion based on the amount of urethane acrylate oligomers in the release composition solutions.

Release Liner Preparation

Resulting diluted release composition solutions RCP-01S-RCP-03S were coated on a polyester film 2262 (available from Mitsubishi Polyester Films) using #3 wire wound rod (commercially available by R.D.S. Webster, New York, USA.). The coated film was placed on a hard core wood board and cured with an UV light through the coated layer by irradiation with a Fusion H lamp (commercially available by Fusion UV Systems, Inc.®, Gaithersberg, MD) set at 100% power and using nitrogen inerting sufficient to bring the oxygen level below 100 ppm. The web speed was set at 6.1 m/min.

Formulations RCP-04S and RCP-04S1 were coated onto a release liner available from 3M Company designated as 3M™ Non-Silicone Non-Fluoro Release Liner 5977 using a similar procedure as for RCP-01S to RCP-03S. 5977 liner has an acrylic based release coating on one of its sides as described in U.S. Pat. No. 7,816,477 B2. Such acrylic based release coating, may be used in differential release liner constructions jointly with release composition solutions according to the invention. Hereby the acrylic based release compositions provide the lower release side whereas the new release composition solutions such as e.g. RCP-04S and RCP-04S1 made with polyurethane (meth) acrylates, provide the side of the liner exhibiting the higher release force from the thermosettable epoxy adhesive film. Hence in table 5 the peel adhesion value is not only measured from RCP-04S and RCP-04S1 but also from its opposing side for showing the lower peel adhesion provided by most acrylic release compositions.

Epoxy Adhesive Film Preparation

The epoxy-based composition for providing a thermosettable epoxy adhesive film was prepared by combining the ingredients from the list of materials of table 2 in a high speed mixer (DAC 150 FVZ Speedmixer, commercially available from Hauschild Engineering) stirring at 3000 rpm. In Table 4, all concentrations are given as wt.-%.

In a first step the epoxy resin, the thermoplastic phenoxy resin and the core shell toughening agent were mixed together for 2 minutes. This formulation was then placed into an air-driven oven at temperature of 95° C. for about 1 h. The hot mixture was again stirred for 2 minutes at 3000 rpm in the speed mixer to ensure complete dispersion of the three ingredients. Then the mixer temperature was reduced to 60° C. and the two curatives together with the further ingredients as set forth in table 4 were added to the mixture, followed by mixing for an additional 2 minutes under vacuum. The resulted mixture was a paste having a uniform consistency. By using a knife coater the mixer was hot coated to a film having thickness of 0.4 mm. The formed film was soft and homogenous when cooled down. For better handling and transport the epoxy adhesive film was placed in between two opposing, protective liners.

TABLE 4

Composition of epoxy adhesive film composition.

| Raw Materials | wt.-% |
|---|---|
| Epikote Resin 828 | 54.5 |
| PKHP-200 | 26 |
| Paraloid EXL 2650J | 13.5 |
| Amicure CG1200 | 3.3 |
| Omicure U52M | 1.5 |
| Microsphere ®F48D | 1.2 |
| Sum | 100.0 |

Test Sample Preparation

For test sample preparation one side of the opposing, protective liners was removed from epoxy adhesive film and replaced with polyester film 2262 available from Mitsubishi Polyester Film, Greer, SC, USA. The second protective liner was then removed and the epoxy adhesive film was laminated with release liner prepared using the release composition precursor solutions or with the acrylic release composition of 5977 liner. The resulting adhesive release liner constructions were allowed to dwell for 72 hours at ambient room temperature (23° C.+2° C.) and 50% (+/−5%) relative humidity prior to testing. These were then cut in machine direction to a width of 25 mm and a length of approximately 300 mm as previously described for peel adhesion testing and peel testing performed in accordance with Pressure Sensitive Tape Council PSTC-101 Method D (Rev May 2007) 'Peel Adhesion of Pressure Sensitive Tape.

Test Results

All testing samples were subjected to 180° peel testing according to test method PSTC 101, test method D and the resulting peel adhesion values listed in table 5.

TABLE 5

180° Peel results after 72 h aging at ambient conditions

| Formulation | 180° Peel Force (ambient-3 days) N/cm |
|---|---|
| RCP-01S | 0.967 |
| RCP-02S | 0.428 |
| RCP-03S | 0.303 |
| RCP-04S | 0.427 |
| RCP-04S1 | 0.517 |
| 5977 liner | 0.072 |

As is apparent from Table 5, the peel force decreases from RCP-01S to RCP-03S as a result of the declining content of CN 9014 in the release composition solutions. In case of the 5977 liner, used as a comparative example for representing an acrylic based release composition, the peel force even further declines due to the complete absence of urethane acrylate oligomers. Further peel force results indicate that RCP-04S1 with 1 wt.-% solids provides—as anticipated—higher peel force values versus RCP-04S with 2% solids.

The invention claimed is:

1. A liner for an adhesive film, the liner comprising:
   (a) a polymeric layer having a first and a second surface, the second surface being opposed to the first surface;
   (b) a first release layer located on top of the first surface of the polymeric layer, the first release layer being obtained from a composition consisting essentially of:
      (b1) at least one difunctional aliphatic urethane acrylate;
      (b2) at least one monoacrylate or at least one monomethacrylate; and
      (b3) at least one diacrylate and/or at least one triacrylate, or at least one dimethacrylate and/or at least one trimethacrylate; and
      (b4) optionally a photoinitiator; and
   (c) a second release layer located on top of the second surface layer of the polymeric layer, the second release layer comprising a copolymer of at least a first alkyl (meth)acrylate monomer and at least one second alkyl (meth)acrylate monomer,
   wherein the first alkyl (meth)acrylate monomer is a (meth)acrylate having C12-30 alkyl group and wherein the second alkyl (meth)acrylate monomer is a (meth)acrylate having a C1-12 alkyl group,
   wherein the first release layer is a homogeneous layer, and wherein the first release layer exhibits a higher peel force than the second release layer.

2. The liner according to claim 1, wherein the at least one aliphatic urethane acrylate or aliphatic urethane methacrylate is a hydrophobic urethane.

3. The liner according to claim 2, wherein the at least one monoacrylate or the at least one monomethacrylate are linear or branched monoacrylate or monomethacrylate aliphatic esters.

4. The liner according to claim 1, wherein the at least one monoacrylate or the at least one monomethacrylate are linear or branched monoacrylate or monomethacrylate aliphatic esters.

5. The liner according to claim 4, wherein the esters contain at least 8 carbon atoms.

6. The liner according to claim 1, wherein the copolymer of the second release layer is a further copolymer of at least one (meth)acrylate ester having a moiety capable of being activated by ultraviolet light.

7. The liner according to claim 1, wherein the first release layer exhibits a 180° peel force of at least 0.2 N/cm, as determined according to PSTC 101.

8. The liner according to claim 1, wherein the first release layer and/or the second release layer are essentially silicone-free.

9. The liner according to claim 1, wherein the first release layer further comprises at least one photoinitiator.

10. The liner according to claim 9, wherein the second release layer further comprises the reaction product of at least one (meth)acrylate ester having a moiety capable of being activated by ultraviolet light.

11. An adhesive article, comprising an adhesive layer having a first and a second surface, the second surface being opposed to the first surface; and at least one first liner according to claim 1, wherein the first release layer of the at least one first liner and the first surface of the adhesive layer have a common interface.

12. The adhesive article according to claim 11, wherein the adhesive article is an adhesive strip, an adhesive film or an adhesive tape.

13. The adhesive article according to claim 11, wherein the adhesive layer is a structural adhesive layer.

14. The adhesive article according to claim 12, wherein the adhesive layer is a structural adhesive layer.

15. The adhesive article according to claim 12, wherein the adhesive article is in the shape of a level-wound roll.

* * * * *